United States Patent
Oshima et al.

(10) Patent No.: US 7,643,079 B2
(45) Date of Patent: Jan. 5, 2010

(54) CONTROL CIRCUIT FOR READING OUT SIGNAL CHARGES FROM MAIN AND SUBSIDIARY PIXELS OF A SOLID-STATE IMAGE SENSOR SEPARATELY FROM EACH OTHER IN INTERLACE SCANNING

(75) Inventors: Hiroyuki Oshima, Asaka (JP); Kazuya Oda, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 418 days.

(21) Appl. No.: 11/545,564

(22) Filed: Oct. 11, 2006

(65) Prior Publication Data

US 2007/0085924 A1   Apr. 19, 2007

(30) Foreign Application Priority Data

Oct. 14, 2005   (JP) ............................. 2005-300081

(51) Int. Cl.
*H04N 3/14* (2006.01)
*H04N 5/335* (2006.01)

(52) U.S. Cl. ...................... 348/315; 348/311; 348/312; 348/317

(58) Field of Classification Search ................. 348/311, 348/312, 317, 320, 315

See application file for complete search history.

(56) References Cited

U.S. PATENT DOCUMENTS

| 6,831,692 | B1 * | 12/2004 | Oda | ............................ 348/315 |
| 7,217,910 | B2 * | 5/2007 | Oda | ......................... 250/208.1 |
| 7,292,279 | B2 * | 11/2007 | Yamazaki | .................... 348/350 |
| 7,420,607 | B2 * | 9/2008 | Ota et al. | ..................... 348/315 |
| 2003/0141564 | A1 | 7/2003 | Kondo et al. | |
| 2004/0017497 | A1 * | 1/2004 | Suzuki et al. | ............... 348/315 |
| 2004/0017498 | A1 * | 1/2004 | Yamashita et al. | .......... 348/315 |
| 2004/0032519 | A1 * | 2/2004 | Oda et al. | .................... 348/294 |

* cited by examiner

*Primary Examiner*—Sinh Tran
*Assistant Examiner*—Wanda M Negron
(74) *Attorney, Agent, or Firm*—Birch, Stewart, Kolasch & Birch, LLP (57) ABSTRACT

In a control circuit for controlling a solid-state image pickup device, two sorts of image data are read out separately with differing sensitivities. A timing generator control in a digital camera controls a timing signal generator to the interlace scanning or to all-pixel scanning, and outputs a timing signal, consistent with this control, to the driver. The driver outputs a driving signal, consistent with the timing signal, to the solid-state image pickup device included in an image pickup unit to read out signal charges. In particular, in interlace scanning, readout of signal charges of main pixels of the image pickup device is separated from that of subsidiary pixels of the device.

11 Claims, 8 Drawing Sheets

CONTROL CIRCUIT FOR READING OUT SIGNAL CHARGES FROM MAIN AND SUBSIDIARY PIXELS OF A SOLID-STATE IMAGE SENSOR SEPARATELY FROM EACH OTHER IN INTERLACE SCANNING

BACKGROUND OF THE INVENTION

1. Field of the Invention

The present invention relates to a control circuit for controlling a solid-state image pickup device, and to a method for driving an image pickup device. The control circuit for controlling a solid-state image pickup device according to the present invention specifically pertains to the technique of controlling the generation of timing signals for reading out, e.g. image data with a wide dynamic range. The method for driving an image pickup device according to the present invention pertains especially to a procedure of reading out signal charges from a solid-state image pickup device which provides for a wide dynamic range.

2. Description of the Background Art

U.S. Patent Application Publication 2003/0141564 A1 to Ryuji Kondo, et al., teaches a solid-state image pick up device in which two pixels, or photosensitive cells, of different photo-sensitivities are employed for each pixel in order to provide for a wide dynamic range. Each pixel is divided into two photosensitive areas, one formed to a higher sensitivity and the other formed to a lower sensitivity, in order to output pixel data of higher and lower sensitivities free of spatial deviation or deviation along time axis. Two images with different sensitivities may be obtained simultaneously by outputting these two sorts of pixel data as one pixel.

If a plural number of color filter segments, arranged on opposite sides of a vertical transfer path, are taken into consideration, color filter segments are arranged in a column of green segments G and a column of blue segments B and red segments R on one side of the vertical transfer path, and a column of green segments G and a column of red segments R and blue segments B on the other side of the vertical transfer path. The pixels are read with the set of the column of green segments G and the column of blue segments B and red segments R in one field and with the set of the column of green segments G and the column of red segments R and blue segments B in the other field.

Meanwhile, interlace readout of signal charges from such an image pickup device does not cause the pixel data of high and low sensitivities to be output separately from each other. Thus, for readout, a line memory is needed for temporarily storing the two sorts of the pixel data, and hence the use of such a solid-state image pickup device leads to increased costs.

SUMMARY OF THE INVENTION

It is an object of the present invention to provide a control circuit for controlling a solid-state image pickup device for separately reading out the two sorts of pixel data of different sensitivities, and a method for driving the solid-state image pickup device.

In accordance with the present invention, there is provided a control circuit for controlling a solid-state image pickup device, made up of first photosensitive cells of relatively higher sensitivity to incident light from an imaging field captured and second photosensitive cells of relatively lower sensitivity than the higher sensitivity to the incident light. The first and second photosensitive cells are arranged in a two-dimensional array for photo-electrically transducing the incident light. The control circuit controls the readout of the signal charges stored in the solid-state image pickup device. The control circuit controls a timing signal generator which generates a timing signal for interlace scanning or for all-pixel scanning in reading out the signal charges in the first and second photosensitive cells. The control circuit transmits the timing signal generated from the timing signal generator by the control circuit to a driving signal generator adapted for generating a driving signal. The control circuit outputs the driving signal, generated by the driving signal generator, to the solid-state image pickup device for reading out the signal charges stored in the first and second photosensitive cells, responsive to the driving signal. The control circuit in the interlace scanning controls the readout of the signal charge in a plurality of number of times from the solid-state image pickup device.

The control circuit for solid-state image pick up device according to the present invention controls the timing signal generator to interlace scanning or to all-pixel scanning, and outputs a timing signal consistent with the control to driving signal generator. The driving signal generator outputs a driving signal, consistent with the driving signal, to the solid-state image pickup device, to read out signal charges. In particular, in interlace scanning, the signal charges from the main pixels of the solid-state image pickup device can be read out separately from those from the subsidiary pixels of the device.

In accordance with the present invention, there is also provided a method of driving a solid-state image pickup device, made up of first photosensitive cells of relatively higher sensitivity to incident light from an imaging field captured and second photosensitive cells of relatively lower sensitivity than the higher sensitivity to the incident light. The first and second photosensitive cells are arranged in a two-dimensional array for photo-electrically transducing the incident light. The method includes the steps of controlling the readout of signal charges in the first and second photosensitive cells to interlace scanning or all-pixel scanning, and controlling the readout of signal charges in a plurality of number of times in the interlace scanning.

The method of driving a solid-state image pick up device, according to the present invention, controls the readout of signal charges in the first and second photosensitive cells to the interlace scanning or to all-pixel scanning. In particular, in the interlace scanning, the signal charges from the first photosensitive cells can be read out separately from those from the second devices.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

With reference to the accompanying drawings, a preferred embodiment of a control circuit for controlling a solid-state image pickup device according to the present invention will be described in detail. The present embodiment is adapted for a case where the control circuit for controlling a solid-state image pickup device according to the present invention is applied to a digital camera 10. Components not directly relevant to understanding the present invention are not shown in the drawings, and a description associated therewith will be dispensed with.

Figure 1:
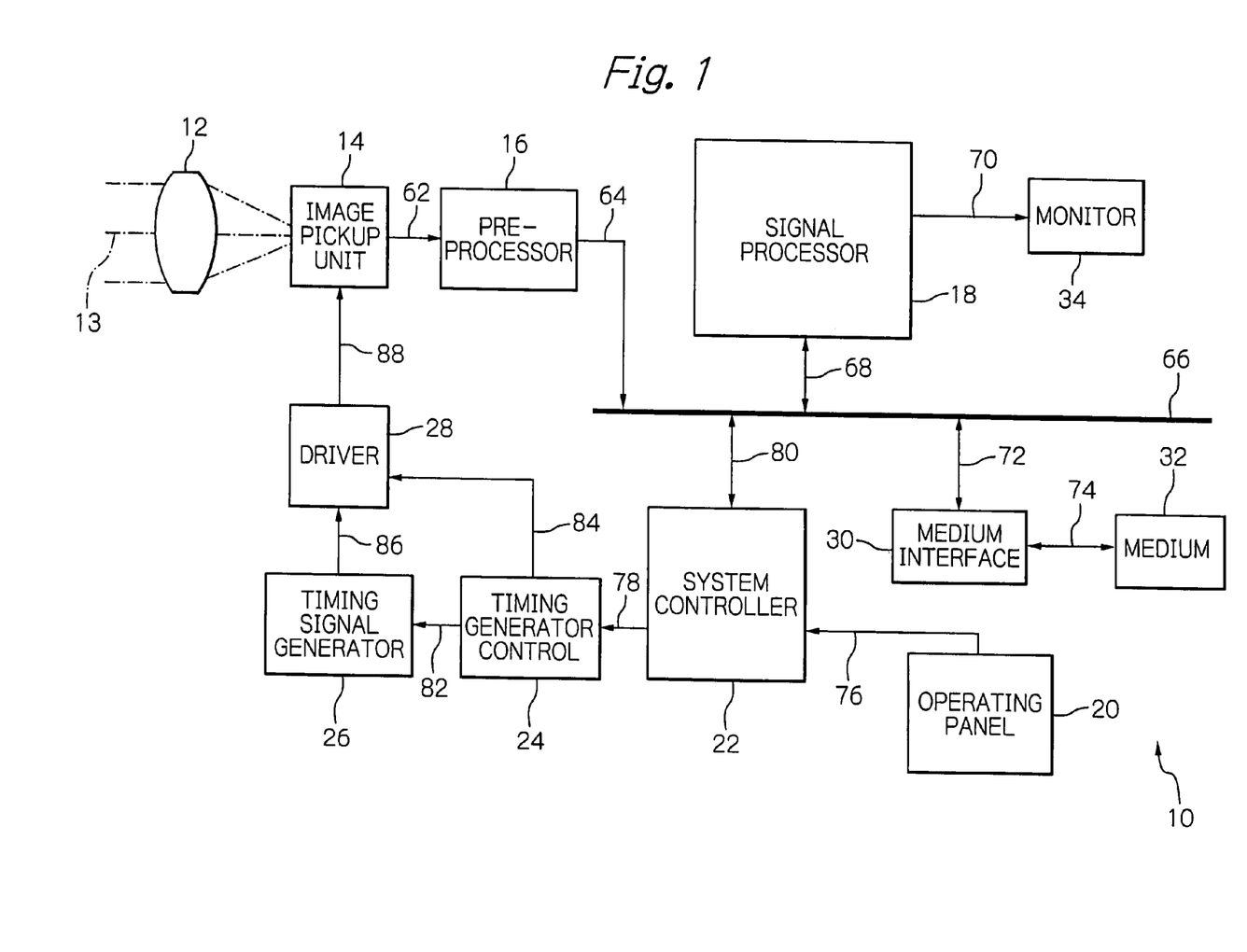
FIG. 1 is a schematic block diagram showing an embodiment of a digital camera to which is applied a control circuit for controlling a solid-state image pickup device according to the present invention.

Referring to FIG. 1, the digital camera 10 of the present embodiment includes an optical system 12, an image pickup unit 14, a pre-processor 16, a signal processor 18, an operating pane 120, a system controller 22, a timing generator (TG) control 24, a timing signal generator 26, a driver 28, a medium interface (I/F) 30, a recording medium 32 and a display monitor 34, which are interconnected as illustrated.

The optical system 12 has the function of receiving incident light 13 from an object field to form an optical image on the image pickup unit 14. The optical system 12 is responsive to a zooming operation or a half-stroke operation of a shutter release key, not shown, applied to the operating panel 20, to adjust its angle of field or focal length.

Figure 2:
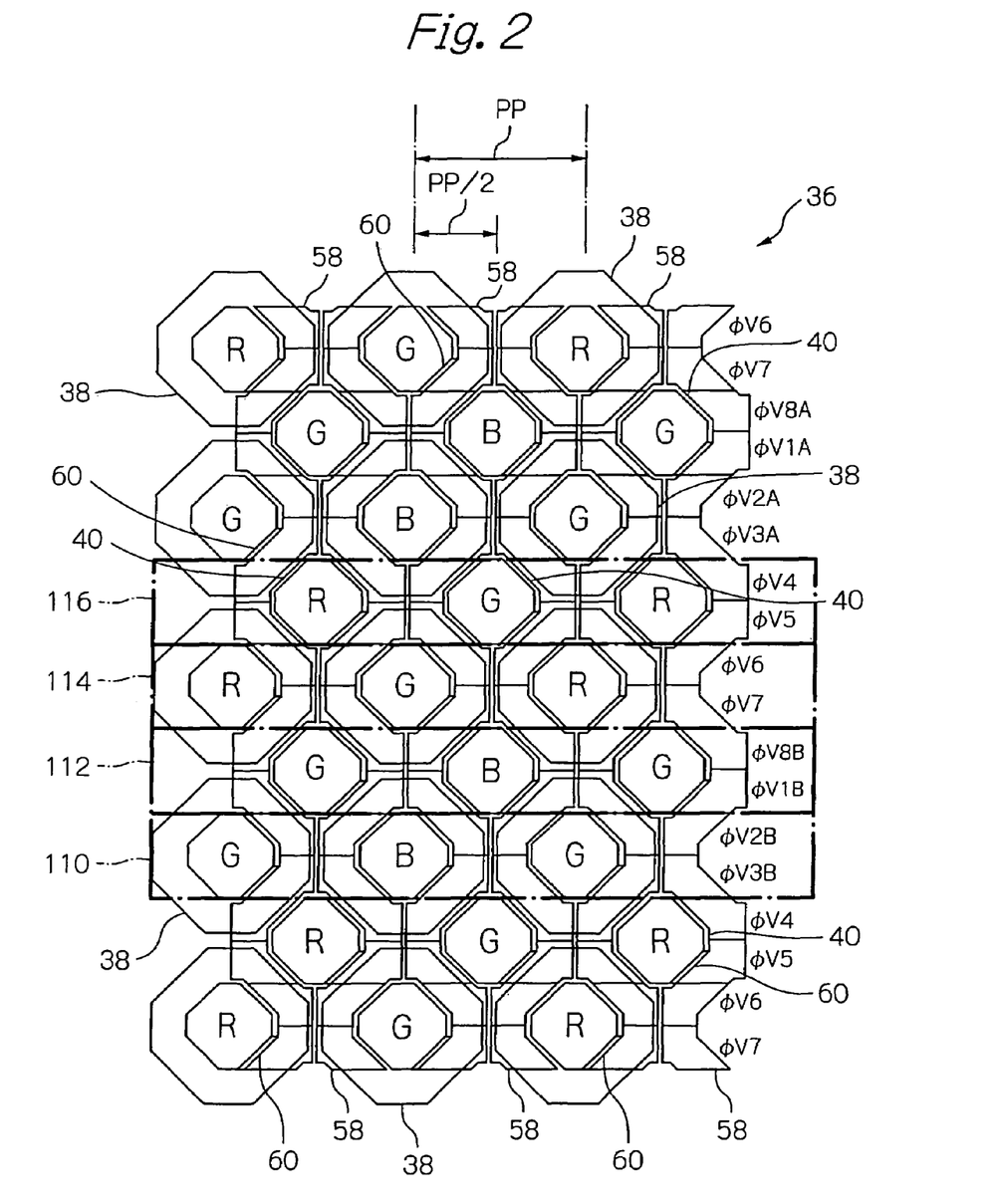
FIG. 2 is a plan view partially showing the essential portion of the photosensitive array of the solid-state image pickup device and a vertical transfer path arranged in an image pickup unit of FIG. 1.

In the image pickup unit 14, there are arrayed color filter segments so that the color filter segments are in register with the photosensitive cells in the incoming direction of the incident light 13. The image pickup unit 14 includes an image pickup device or image sensor 36 having the function of color-separating the incident light 13 and converting the light of the color components, resulting from color separation, into signal charges, by the photosensitive cells, to output a corresponding electrical signal. Referring additionally to FIG. 2, showing the image pickup device 36, the color filter segments of three prime colors, namely red (R), green (G) and blue (B), are arrayed so that the pixels of two neighboring rows are shifted by a one-half pixel pitch with respect to the pixel pitch PP in the horizontal direction. There are two types of the pixels of the image pickup device 36, one is relatively higher sensitivity pixels 38 and the other is relatively lower sensitivity pixels 40.

The image pickup device 36 of the instant embodiment has two kinds of micro-lenses 42 and 44 in the form of on-chip lens. In order to provide for a difference in the light condensing power for the incident light 13 and hence to provide for a difference in the optical sensitivity, the micro-lenses 42 and 44 are different in size or spherical curvature as shown in FIGS. 3A through 3D. The relatively higher and lower sensitivity pixels 38 and 40 are briefly shown in cross-sectional views taken along dot-and-dash lines 3B-3B and 3D-3D of FIGS. 3A and 3C, respectively. The higher and lower sensitivity pixels 38 and 40 constitute a photosensitive layer 48 in a substrate 46 for photo-electrically converting the incident light 13. A transparent member 50 is provided for covering the upper surface of the photosensitive layer 48. A pair of electrodes 52, 52 are formed on either sides of and on the upper surface of the photosensitive layer 48. The electrodes 52, 52 are covered up by an optical shielding member 54 adapted for shielding the incident light 13. The light shielding member 54 has its upper surface smoothed in its entirety with a transparent member 50. On the smoothed upper surface, there are formed color filter segments 56 exhibiting spectral sensitivity characteristics. On the top of the color filter segments 56, there are arrayed micro-lenses 42 and 44 having differential curvatures, as apparent from FIGS. 3B and 3D.

Figure 3A:
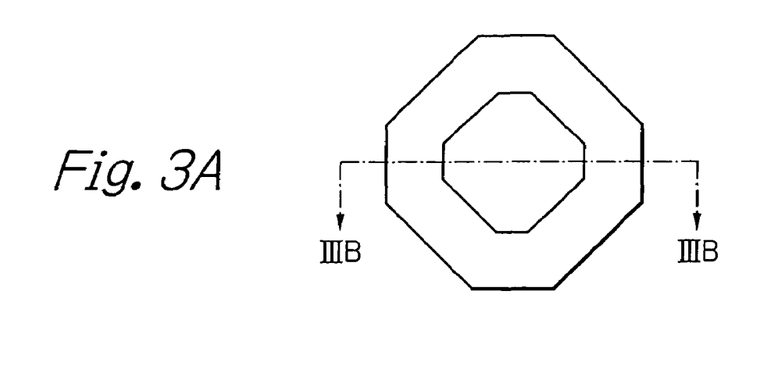
FIGS. 3A through 3D are schematic cross-sectional views showing the cross sections of the main and subsidiary pixels in the photosensitive array of FIG. 2.
Figure 3B:
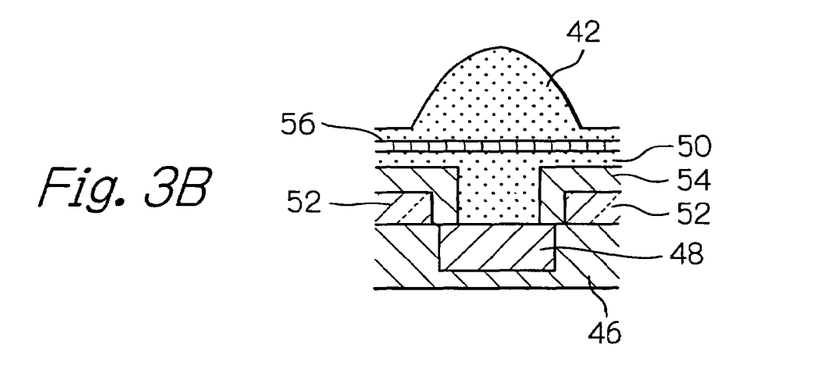
Figure 3C:
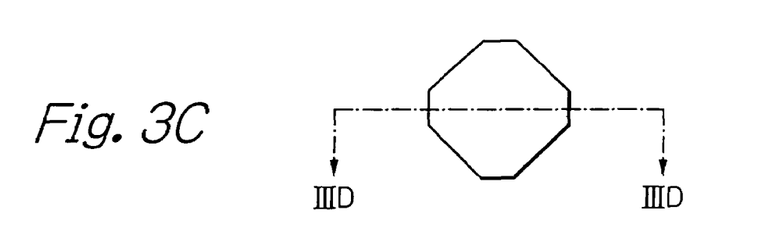
Figure 3D:
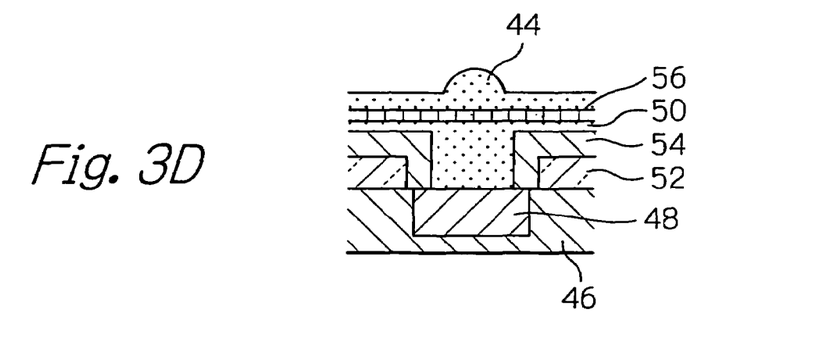

Directly below the electrodes 52, there are arrayed vertical transfer paths, not shown, depending on the levels of the driving signals transmitted to the electrodes.

For the higher sensitivity pixel, such a micro-lens having a larger lens diameter and hence a higher light condensing power may desirably be formed on the light incident side. For the lower sensitivity pixel, such a micro-lens having a lens diameter smaller than the normal or larger lens diameter is used.

Reverting now to FIG. 2, the higher and lower sensitivity pixels are arranged every other row and every other column. The higher and lower sensitivity pixels are also termed the main and subsidiary pixels, respectively. As the color filter segments, higher and lower sensitivity pixels are arranged as a set or pair so that two pixels of the same color are arrayed for extending in an obliquely upward direction on the photosensitive array 36. By this array of the color filter segments, two consecutive ones of every four rows are for the colors G and B for with the alternating two rows neighboring thereto, or remaining rows, are for the colors R and B.

In the image pickup device 36, a field shift gate 60 is formed between the relatively higher and lower sensitivity pixels 38 and 40 and the vertical transfer path 58. The field shift gate 60 is meanderingly formed because the higher and lower sensitivity pixels 38 and 40 are arrayed with a shift of one half of the pixel pitch, equal to PP/2.

The signal charges are read out from the image pickup device 36 with a row of the main pixels and a row of the subsidiary pixels, totaling at two rows, as a first field depicted with reference numerals 110 and 112, respectively, in FIG. 2, and with a row of the main pixels and a row of the subsidiary pixels, totaling at two rows, and neighboring to the first-stated two rows of the main and subsidiary pixels, as a second field depicted with reference numerals 114 and 116, respectively. In the present embodiment, distinction is made in the signal readout of the first field. More specifically, the vertical driving signals are supplied to the main pixels from electrodes V3A and V3B, while being supplied to the subsidiary pixels from electrodes V1A and V1B. By forming the electrodes in this manner, vertical thinning becomes possible in signal readout from the image pick up device 36 in response to the vertical driving signal transmitted to only one electrode of each of the main and subsidiary pixels. For all-pixel readout, the same vertical driving signals $\Phi V1$ and $\Phi V3$ are supplied, in the image pickup device 36, without making any distinctions. In the following, signals are designated with reference numerals of connections on which they appear. The signal readout from the image pickup device 36 will be described subsequently. The system for reading out signals from the image pickup device 36 may not be restricted to the two-field reading but may be such that the image pickup device may be read out on an n-field basis, where n is a natural number more than unity, or alternatively read out in a thinning-out fashion. The image pickup unit 14 outputs an analog image signal 62, as read out from the image pickup device 36, to the pre-processor 16.

The pre-processor 16 has the function of performing noise reduction and digitization on the analog image signal 62 as supplied. The correlated double sampling (CDS) circuit, not shown, reduces the noise contained in the analog image signal 62 to transmit the resulting noise-free analog image signal to an analog-to-digital (AD) converter, also not shown. The AD converter digitizes the noise-free analog image signal. The pre-processor 16 outputs digitized image data 64 over a bus 66 and a signal line 68.

The signal processor 18 has the function of performing the processing for providing for synchronizing, luminance and chrominance (Y/C) signal conversion, compression/decompression and display conversion, for the digitized image data 64 supplied thereto in the recording compression mode. The processing for providing for synchronizing means the processing for providing for the same output timing of the three prime colors for each pixel. The signal processor 18 outputs the digitized image data 64, supplied thereto in the recording raw mode, without performing any signal processing. When a through picture mode is selected, i.e. an image captured by the image pickup device 14 is directly to be displayed on the display monitor 34, the signal processor 18 performs the processing for providing for the synchronizing, Y/C signal conversion and display conversion on the digitized image data 64 to output display image data 70 on the monitor 34.

In the recording compression mode or in the recording raw mode, the signal processor 18 outputs processed image data to the medium interface 30 over a signal line 68, a bus 66 and a signal line 72. The medium interface 30 outputs image data 74 to the recording medium 32. In image reproduction, the image data 74 is read out from the medium 32 and the so read out data is output to the medium interface 30. The medium interface 30 outputs the image data 74, supplied thereto, to the signal processor 18 over the signal line 72, bus 66 and signal line 68. The signal processor 18 performs conversion, consistent with the recording mode, on the image data 74, and transmits the resultant display image data 70 to the monitor 34.

The operating panel 20 has the function of manually giving commands on the operations in the digital camera 10. The operating panel 20 outputs an operating signal 76, in response to the depressing operation of keys and a shutter button, not shown, in its half or full stroke, and according to the recording modes, to the system controller 22.

The system controller 22 has the function of generating control signals for controlling the signal processor 18, timing generator control 24 and the medium interface circuit 30. The system controller 22 generates control signals 78 and 80 in response to the operating signal 76. The system controller 22 generates the control signal 78 for controlling the timing generator control 24, to output the so generated control signal to the timing generator control 24. The system controller 22 generates the control signal 80 for controlling the signal processor 18 and the medium interface 30, and outputs the so generated control signal 80.

The timing generator control 24 has the function of controlling the timing signal generator 26 for generating the signal in depending on whether or not the signals are to be read by a thinning readout. The timing generator control 24 also has the function of controlling a driving signal from the driver 28 responsively to readout from the subsidiary pixel field. The timing generator control 24 generates a control signal 82 for signal generation in the timing signal generator 26. The control signal 82 exercises control for reading out main and subsidiary pixels in respective different fields, reading out only main pixels in respective different fields, simultaneously reading out all of the main and subsidiary pixels in distinct fields, or for reading out the pixels by thinning readout. The control signal 82 is generated responsive to control by the control signal 78, while the control signal 78 gives a command which readout is to be used responsive to the operating signal 76.

The timing generator control 24 generates and outputs a driving signal, in particular a control signal 84 which controls or modulates the substrate potential for reading out the subsidiary pixels. This operation is not limited to readout of the subsidiary pixels but can also be carried out in reading out the main pixels. It is desirable to provide for differences in the control of the substrate potential.

The timing signal generator 26 has the function of generating a timing signal conforming to all-pixel readout and to thinned readout. The timing signal generator 26 generates, e.g. a vertical synchronous signal VD, a horizontal synchronous signal HD, an overflow drain (OFD) signal, a vertical timing signal and a horizontal timing signal to output the so generated signals to the driver 28 as a timing signal 86.

The driver 28 has the function of generating a driving signal consistent with the timing signal 86. In particular, the driver 28 outputs vertical driving signals $\Phi$V1A, $\Phi$V1B, $\Phi$V2, $\Phi$V3A, $\Phi$V3B, $\Phi$V4, $\Phi$V5, $\Phi$V6, $\Phi$V7 and $\Phi$V8 and an OFD signal, as a driving signal 88, to the image pickup device 36. The OFD signal is a combination of the substrate potential, controlled for reading out the subsidiary pixels, and the sweep-out signal or the draining signal.

In the image pickup device 36 of the present embodiment, signal charges read out from the photosensitive cells are transferred vertically in eight-phase driving. The capacity of a packet of the signal charges in such eight-phase driving is smaller than that in, e.g. four-phase driving. Hence, the signal charges, stored in reading out the signal charges, may not be accommodated in a packet for signal charges, so that there may occur the overflow of the signal charges. In order to avoid this from occurring, a packet of signal charges may be formed in an area located above the vertical transfer path neighboring to the field shift gate, thereby increasing the packet capacity. The driving signals V2A, V2B, V8A and V8B are designed, e.g. as to values, to cope with the generation of such packets of image signals and the driving signals thus designed, in signal values for example, are applied to generate packets of image signals.

The medium interface 30 is adapted to interface with the medium 32 responsively to the control signal transmitted from the system controller 22. The recording medium 32 has the function of recording or reading out data transmitted thereto or recorded therein. The medium 32 is preferably a semiconductor memory. The display monitor 34 is desirably a liquid crystal display.

Figure 4A:
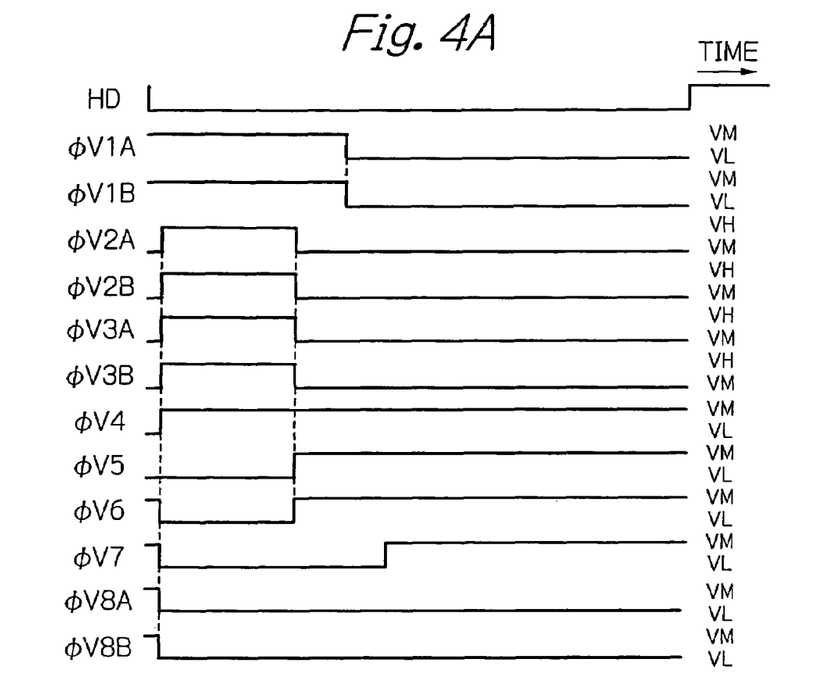
FIGS. 4A and 4B are timing charts for illustrating signal charge readout in the digital camera of FIG. 1 from one main pixel field to another.
Figure 4B:
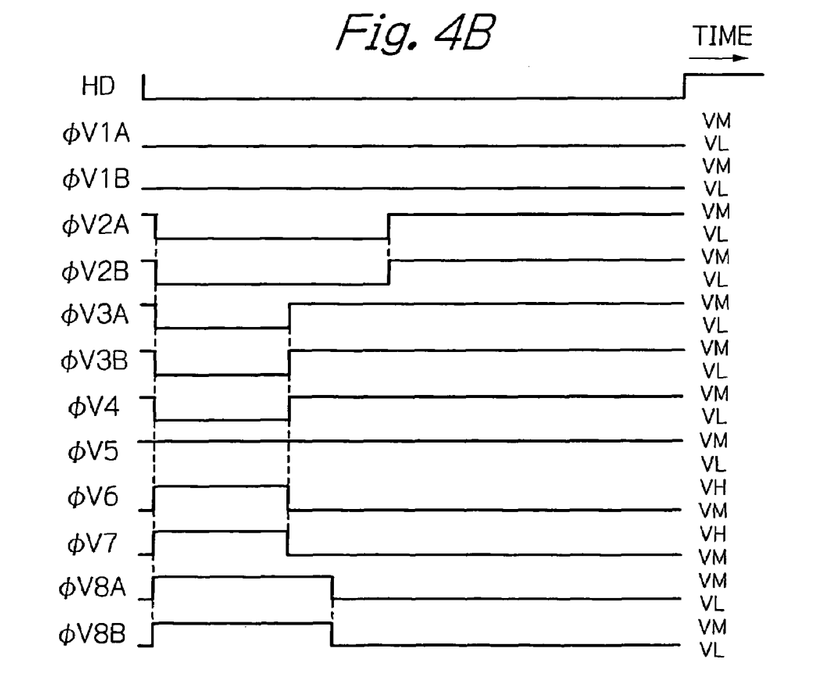

The operation of the digital camera 10 will now be described according to the present invention. FIGS. 4A and 4B show vertical driving signals transmitted when reading out the first and second fields of the main pixels, respectively. In the first field of the main pixels, shown in FIG. 4A, the vertical driving signals $\Phi$V3A and $\Phi$V3B, supplied to the field shift gate 60 of main pixels, shown in FIG. 2, are set to the high level "VH" thereof. Moreover, the vertical driving signals $\Phi$V2A and $\Phi$V2B are also set to the high level "VH" thereof, while the vertical driving signals $\Phi$V1A and $\Phi$V1B are set to the middle level "VM" thereof in order to cope with shortage of the packet capacity. This forms two packets of the deepest potential and a packet of a medium depth of potential in reading out the signal charges of the first field.

The timing chart of FIG. 4B is for the second field of the main pixels. The vertical driving signal $\Phi$V7, supplied to the field shift gate 60 for the main pixels, shown in FIG. 2, is set to its high level "VH". In this case, the vertical driving signal ΦV6 is set to its high level "VH", and the vertical driving signal ΦV5 is again set to its middle level "VM", in order to cope with the shortage of the packet capacity. This forms two packets of the deepest potential and a packet of a medium depth of potential in reading out the signal charges of the second field.

Figure 5A:
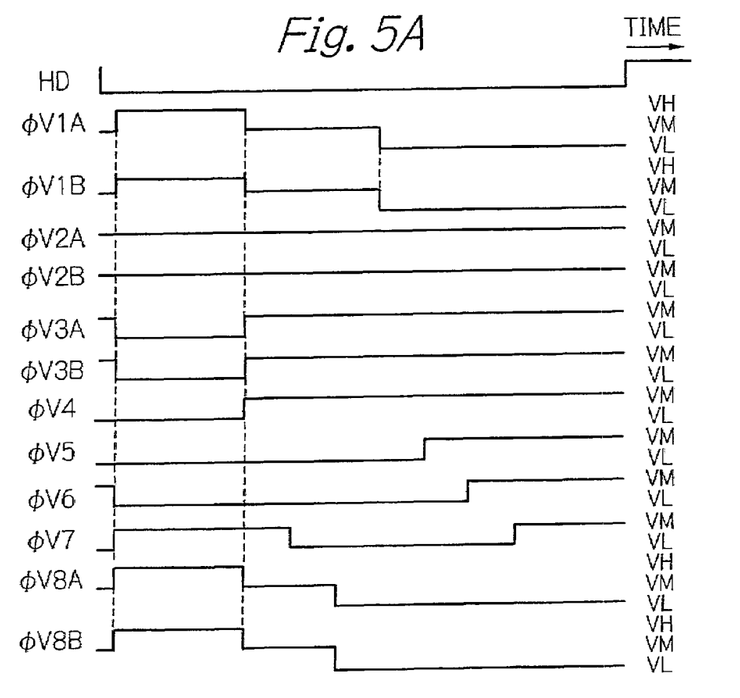
FIGS. 5A and 5B are timing charts for illustrating signal charge readout in the digital camera of FIG. 1 from one subsidiary pixel field to another.

FIG. 5 shows vertical driving signals transmitted when reading out the first and second fields of the subsidiary pixels. In the first field of the subsidiary pixels, shown in FIG. 5A, the vertical driving signals ΦV1A and ΦV1B, supplied to the field shift gate 60 of main pixels shown in FIG. 2, are set to the high level "VH" thereof. Moreover, the vertical driving signals ΦV8A and ΦV8B are again set to the high level "VH" thereof, while the vertical driving signal ΦV7 is also set to its middle level "VM", in order to cope with shortage of the packet capacity. This forms two packets of the deepest potential and a packet of a medium depth of potential in reading out the signal charges of the first field.

Figure 5B:
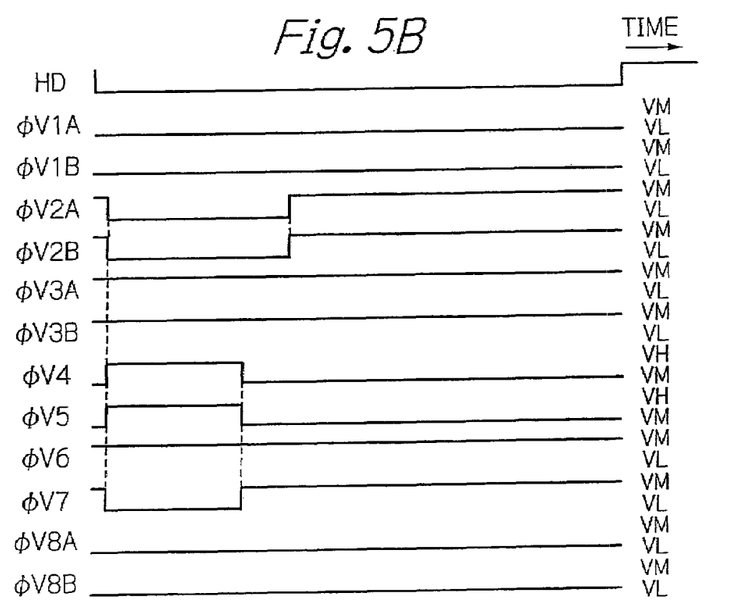

The timing chart of FIG. 5B is for the second field of the subsidiary pixels. The vertical driving signal ΦV5, supplied to the field shift gate 60 for the main pixels, shown in FIG. 2, is set to its high level "VH". In this case, the vertical driving signal ΦV4 is set to its high level "VH", and the vertical driving signals ΦV3A and ΦV3B are also set to the middle level "VM" thereof, in order to cope with the shortage of the packet capacity. This forms two packets of the deepest potential and a packet of a medium depth of potential in reading out the signal charges of the second field.

Figure 6:
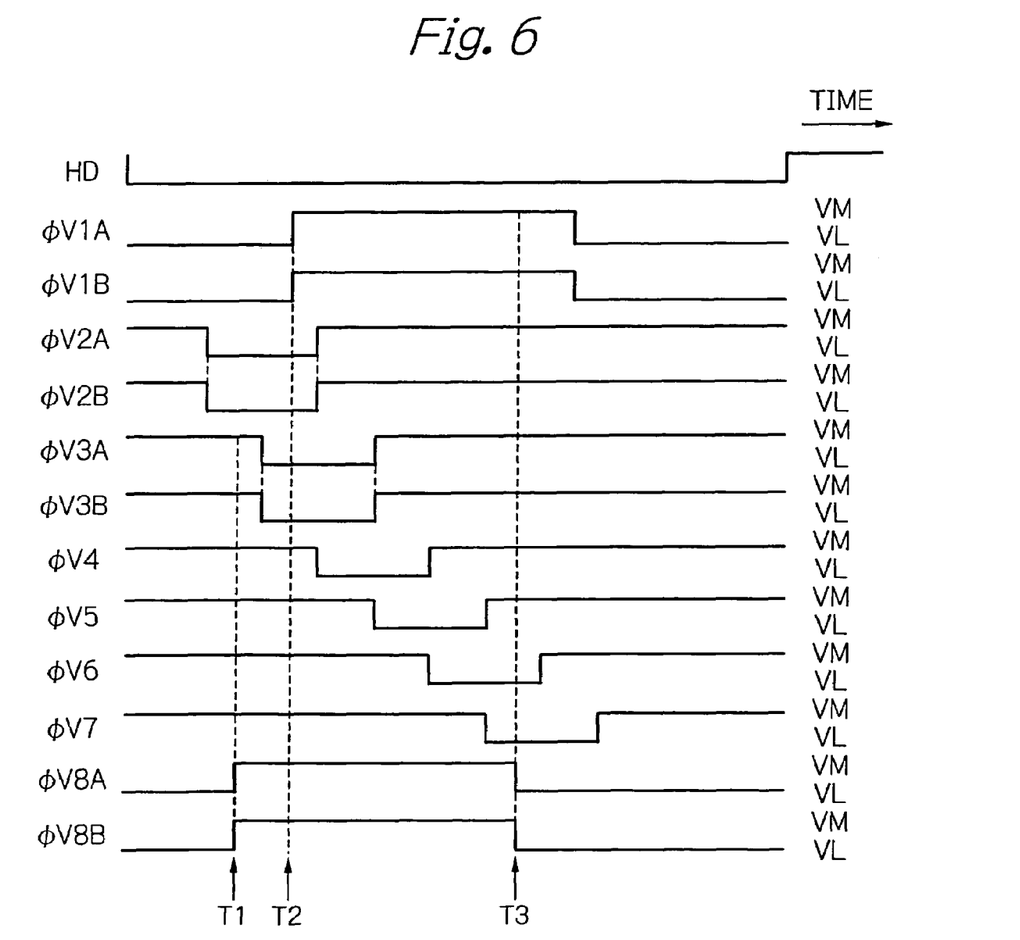
FIG. 6 is a timing chart for illustrating vertical signal charge transfer in the digital camera of FIG. 1.

The signal charges, thus read out, are transferred to the horizontal transfer path, not shown, subject to supplying the vertical driving signals shown in FIG. 6. This transfer is performed by packet movement brought about responsive to level changes of levels "VL" and "VM". In the time domain, as the vertical driving signals ΦV8A and ΦV8B are changed to the level "VM" at time T1, a packet is formed in the relevant vertical transfer path 58. After this packet has been formed, the vertical driving signals ΦV1A and ΦV1B are changed at time T2 to the level "VM". By these level changes, a packet is formed in the vertical transfer path 58, beginning from the position where the vertical driving signals ΦV3A and ΦV3B are supplied, until a time point T3 when the vertical driving signals ΦV8A and ΦV8B are of the low level "VL". With the vertical driving signals ΦV8A and ΦV8B being of the low level "VL" at time T3, a potential barrier is formed to store six packets of signal charges. At time T3, five packets of signal charges are formed from the vertical driving signals ΦV1A, ΦV1B up to the vertical driving signal ΦV5, with the potential barrier operating as a stopper. The signal charges, thus read out in the form of packets of signal charges, are sequentially transferred towards the horizontal transfer path.

Figure 7:
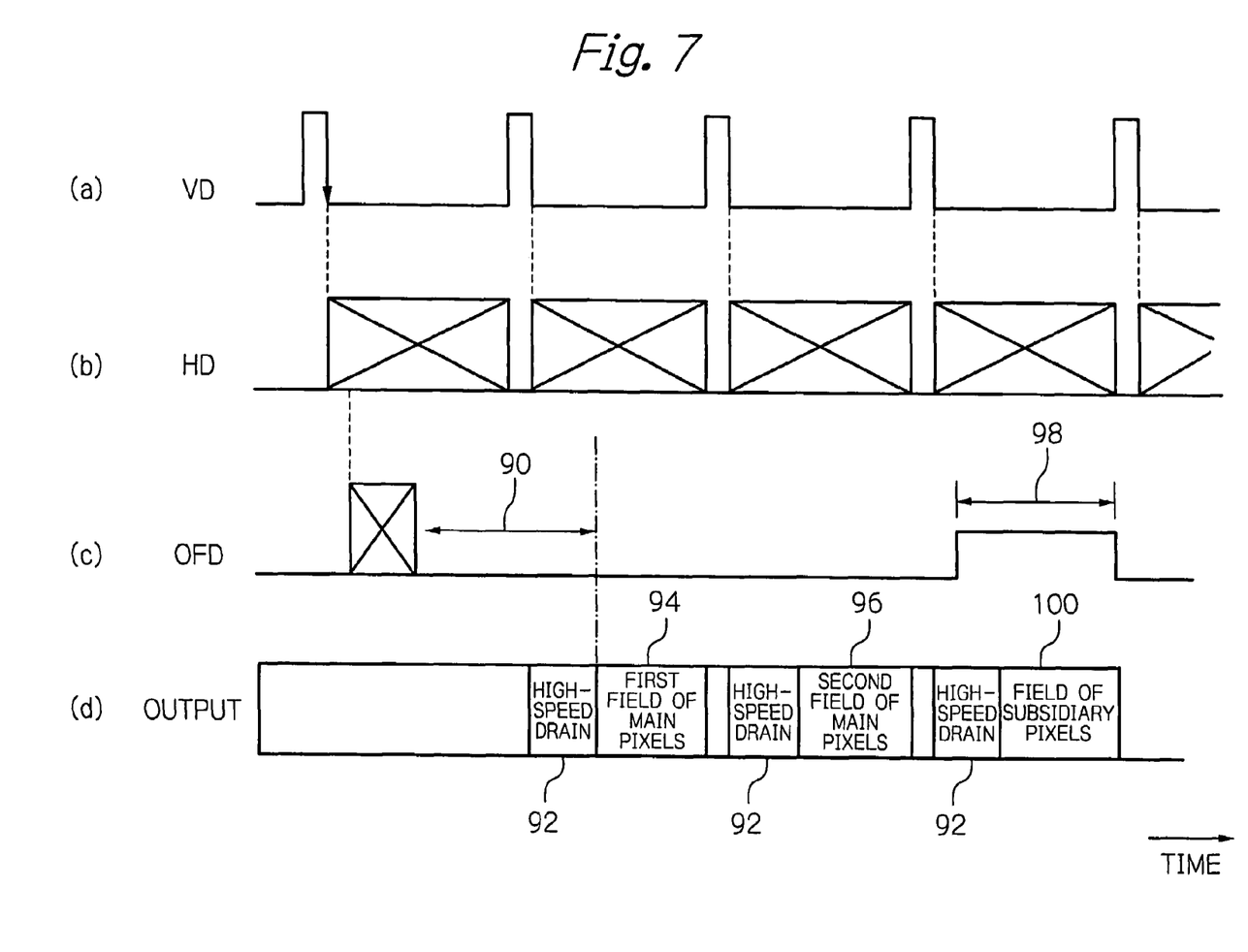
FIG. 7 is a timing chart useful for understanding the saturation suppression voltage of a subsidiary pixel field in the digital camera of FIG. 1.

A sequence of operations in the digital camera 10 will now be described. When the shutter release button, not shown, of the operating panel 20 of the digital camera 10 is thrust to its full stroke, an operating signal 76 (S2) is transmitted to the system controller 22. The system controller 22 in turn outputs the control signal 78 to the timing generator control 24. The timing generator control 24 transmits the control signal 82 to the timing signal generator 26. The timing signal generator 26 outputs the timing signal 86, including the vertical and horizontal synchronous signals VD and HD, shown in FIG. 7, lines (a) and (b), and the OFD signal. The OFD shown in FIG. 7, line (c), is output from the driver 28 as an electronic shutter signal. The time period during which no electronic shutter signal is output is equivalent to an exposure time 90. Turning to an output of FIG. 7, line (d), there is provided a high-speed drain period 92 until the end of the exposure. The purpose of providing the high-speed drain period 92 is to sweep out signal charges stored in the vertical transfer path 58 and in the horizontal transfer path, not shown.

After the exposure, the signal charges of the main pixels of the first field are read out by signal charge readout shown in FIG. 4A. The signal charges are transferred by the transfer driving of FIG. 6, without color mixing, by way of performing signal charge readout 94 of the main pixels of the first field. The high-speed draining 92 is again carried out and the signal charges of the main pixels of the second field are then read out by signal charge readout shown in FIG. 4B, by way of performing signal charge readout 96 of the main pixels of the second field.

Then, before reading out the subsidiary pixel field, the timing generator control 24 outputs the control signal 84 to the driver 28. The driver 28 raises or modifies the OFD voltage as from the time of the high-speed draining until the end of the readout of the signal charges of the fields of the subsidiary pixels. This sweeps out signal charges left over in each transfer path. The saturation output of the subsidiary pixels may be suppressed by providing a period of voltage elevation 98 for the OFD voltage. No blooming is produced even if concurrent readout of the totality of pixels (subsidiary pixel fields 100) is carried out without making distinction between the first and second fields of the subsidiary pixels. In this manner, the signal charges may be read out from the main and subsidiary pixels in different fields.

Figure 8:
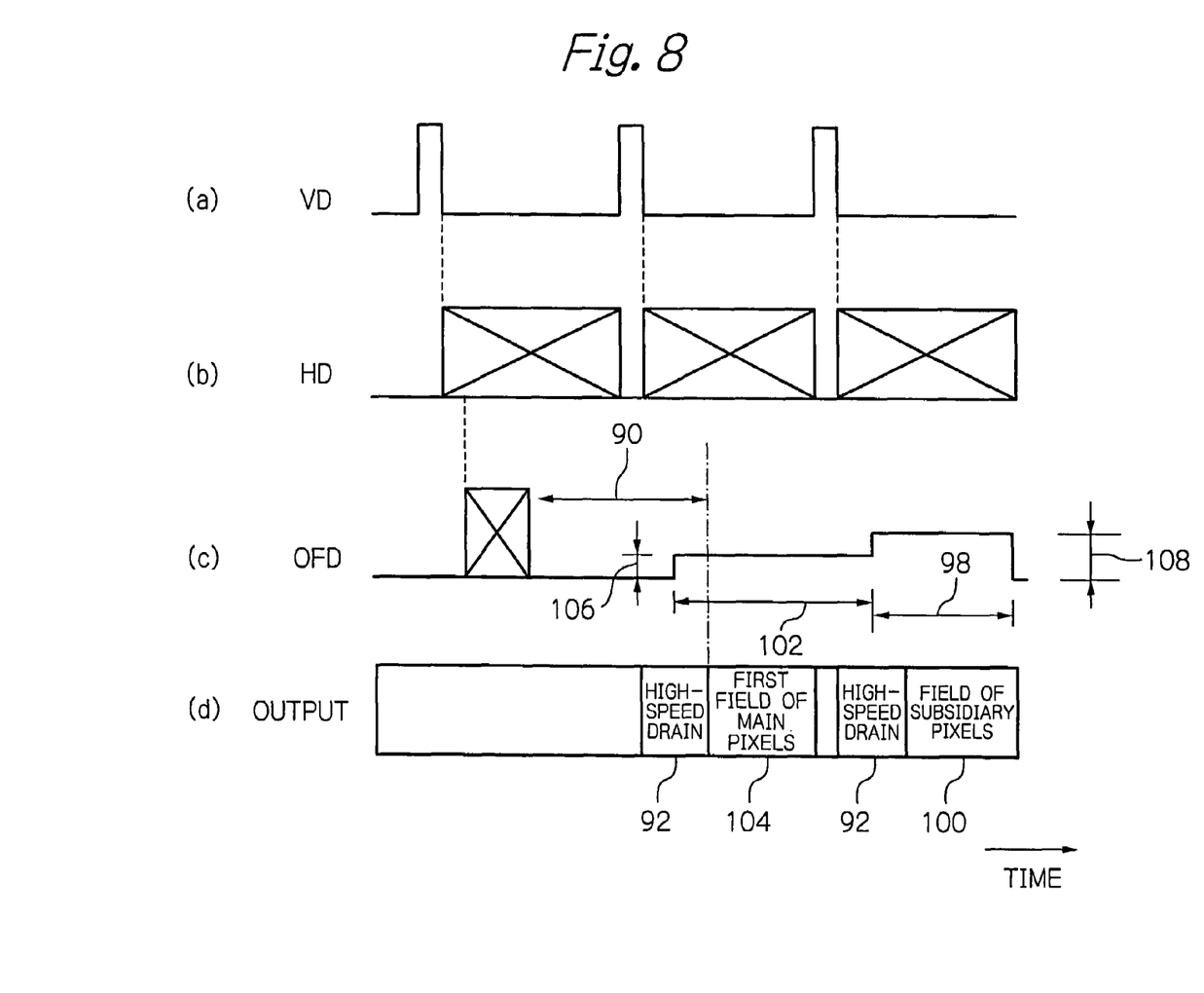
FIG. 8 is a timing chart useful for understanding the different saturation suppression voltages of the main and subsidiary pixel fields in the digital camera of FIG. 1.

The OFD voltage may be increased not only during the period 98 including the readout period for the subsidiary pixel fields, but also during a period 102 including main pixel fields, as shown in FIG. 8, line (c). Turning to the outputting of FIG. 8, line (d), signal charges of the main pixels are read out simply to form a main pixel field, without making distinctions of the first and second fields. It is noted that an OFD voltage 108 during the period 98 is set so as to be higher than the OFD voltage 106 during the period 102.

Meanwhile, the value of the OFD voltage to be raised is usually determined depending on device characteristics. In distinction from the usual OFD voltage, the OFD voltage in the present embodiment is desirably set stepwise as different saturation suppression voltages for the main and subsidiary pixels.

The present invention is not limited to the illustrative embodiment applied to a digital camera, but may, of course, be applied to a mobile phone with camera function as well.

The entire disclosure of Japanese patent application No. 2005-300081 filed on Oct. 14, 2005, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A solid-state image pickup apparatus for reading out a signal charge stored in each of photosensitive cells of a solid-state image pickup device which comprises pixels each of which includes a photosensitive cell for photo-electrically transducing incident light from an imaging field to be captured, said photosensitive cells being arranged in a two-dimensional array so that adjacent ones of said photosensitive cells are shifted from each other in a horizontal direction and a vertical direction, each of said photosensitive cells having an aperture on which light is incident and which has an area formed uniform throughout the entire photosensitive cells, each of said photosensitive cells having a first photosensitive cell acting as a main pixel to output more signal charges and a second photosensitive cell acting as a sub-pixel to output less signal charges than said first photosensitive cells, said apparatus comprising:

a controller for controlling readout of said first and second photosensitive cells in either one of interlace scanning and all-pixel scanning, and generating a control signal setting substrate potential different between said first and second photosensitive cells;

a timing signal generator for generating timing signals in response to the control signal; and a driving signal generator responsive to the timing signals for providing said solid-state image pickup device with a driving signal to cause said solid-state image pickup device to read out the signal charge stored in said first and second photosensitive cells, said driving signal generator being responsive to the control signal to apply the different substrate potential generated to each of said first and second photosensitive cells.

2. The apparatus in accordance with claim 1, wherein said controller reads out signal charges from said first and second photosensitive cells in respective different fields of interlace.

3. The apparatus in accordance with claim 1, wherein said controller controls said timing signal generator to read out the signal charge from said first and second photosensitive cells as at least three fields of interlace.

4. The apparatus in accordance with claim 1, wherein, when said solid-state image pickup device is applied to a mobile phone, said controller is provided for controlling the readout of the signal charge.

5. The apparatus in according with claim 1, wherein said solid-state image pickup device includes microlenses formed to correspondingly cover the aperture of said photosensitive cells, said microlens for said first photosensitive cell having a smaller curvature, and said microlens for said second photosensitive cell having the curvature larger than the curvature for said first photosensitive cell.

6. The apparatus in according with claim 1, wherein said controller controls said driving signal generator to make the substrate potential at the readout of the signal charges from said second photosensitive cells higher than the substrate potential at the readout of the signal charges from said first photosensitive cells to cause all-pixel reading from said photosensitive cells.

7. A method of driving a solid-state image pickup apparatus for reading out a signal charge stored in each of photosensitive cells of a solid-state image pickup device which comprises pixels each of which includes a photosensitive cell for photo-electrically transducing incident light from an imaging field to be captured, said photosensitive cells being arranged in a two-dimensional array so that adjacent ones of said photosensitive cells being shifted from each other in a horizontal direction and a vertical direction, each of said photosensitive cells having an aperture on which light is incident and which has an area formed uniform throughout the entire photosensitive cells, each of said photosensitive cells having a first photosensitive cell acting as a main pixel to output more signal charges and a second photosensitive cell acting as a sub-pixel to output less signal charges than said first photosensitive cells, said method comprising:

a first step of controlling readout of said first and second photosensitive cells in either one of interlace scanning and all-pixel scanning, and generating a control signal satisfying an exposure condition calculated from the incident light by a controller generating a control signal setting substrate potential different between said first and second photosensitive cells;

a second step of generating timing signals by a timing signal generator generating the timing signals in response to the control signal;

a third step of applying generated substrate potential different for said first and second photosensitive cells to said photosensitive cells by a driving signal generator generating driving signals to read out stored signal charges based on supplied timing signals to transfer the signal charges.

8. The method in accordance with claim 7 wherein the signal charge is read out from the first and second photosensitive cells in respective different fields of interlace.

9. The method in accordance with claim 7, wherein the signal charge is read out from the first and second photosensitive cells as at least three fields of interlace.

10. The method in accordance with claim 7, wherein said driving signal generator is controlled so as to make a potential of a substrate at the readout of the signal charge from said second photosensitive cells higher than the potential of the substrate at the readout of the signal charge from said first photosensitive cells, and said controller controls a driving signal driving the image pickup device so as to read out all signal charges in two fields of interlace.

11. The method in according with claim 7, wherein said method controls the substrate potential at the readout of the signal charges from said second photosensitive cells so as to be higher than the substrate potential at the readout of the signal charges from said first photosensitive cells to cause all-pixel reading out from said photosensitive cells.

* * * * *

UNITED STATES PATENT AND TRADEMARK OFFICE
CERTIFICATE OF CORRECTION

PATENT NO.        : 7,643,079 B2                                              Page 1 of 1
APPLICATION NO.   : 11/545564
DATED             : January 5, 2010
INVENTOR(S)       : Oshima et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 504 days.

Signed and Sealed this

Sixteenth Day of November, 2010

David J. Kappos
*Director of the United States Patent and Trademark Office*